United States Patent [19]

Ellsworth

[11] Patent Number: 4,540,026
[45] Date of Patent: Sep. 10, 1985

[54] PNEUMATIC POTENTIOMETER

[76] Inventor: William D. Ellsworth, 39 Red Maple Dr., Fairport, N.Y. 14450

[21] Appl. No.: 555,568

[22] Filed: Nov. 28, 1983

[51] Int. Cl.³ ............................................. F16K 11/085
[52] U.S. Cl. ................................ 137/862; 137/625.11; 137/861; 137/887; 251/117; 251/126
[58] Field of Search ..................... 137/625.11, 625.13, 137/625.15, 625.19, 861, 862, 876, 887; 251/117, 126

[56] References Cited

U.S. PATENT DOCUMENTS

| | | | |
|---|---|---|---|
| 2,509,456 | 5/1950 | Saballus | 251/117 |
| 3,150,686 | 9/1964 | Kachline | 137/861 |
| 3,174,509 | 3/1965 | Wadey | 137/625.13 X |
| 3,175,583 | 3/1965 | Fortmann | 137/625.19 X |
| 3,461,833 | 8/1969 | Boyadjreff | 137/861 X |
| 3,534,757 | 10/1970 | Doherty | 137/15 |
| 3,657,880 | 4/1972 | Greune | 251/126 X |
| 3,773,078 | 11/1973 | Suntheimer | 137/625.11 |
| 3,837,360 | 9/1974 | Bubula | 137/625.11 X |
| 3,901,277 | 8/1975 | Viets | 251/126 X |
| 4,305,417 | 12/1981 | Bell, Jr. | 137/625.11 X |

Primary Examiner—Alan Cohan
Assistant Examiner—John C. Fox
Attorney, Agent, or Firm—Shlesinger, Fitzsimmons & Shlesinger

[57] ABSTRACT

Fluid under pressure, such as compressed air, is applied to one end of an elongate, thin, tubular plenum, the opposite end of which exhausts to the atmosphere. The plenum has intermediate its ends a plurality of axially spaced exhaust ports, which are connected to a valve mechanism having a rotary or reciprocable valve stem, which can be adjusted selectively to connect any one of the plenum exhaust ports through a single output port to a pneumatically operated device. The pressure of the air traveling through the plenum drops at a substantially linear rate, so that the pressures at the spaced exhaust ports can be plotted against the respective distances of these ports from the inlet end of the tubular plenum, thereby to provide a curve which can be used for predicting the pressure at any given point along the length of the plenum.

12 Claims, 9 Drawing Figures

PNEUMATIC POTENTIOMETER

BACKGROUND OF THE INVENTION

This invention relates to pneumatic controls, and more particularly to a novel instrument which functions as a pneumatic potentiometer. More specifically, this invention relates to an adjustable pressure supply which comprises a tubular plenum having compressed air flowing therethrough, and a pneumatic switch having an input adjustably connected to any one of a plurality of axially spaced ports in the plenum thereby to adjust the output pressure of the switch.

It has long been customary to employ pneumatic switches for controlling pneumatically operated devices. Typically such a switch can be adjusted linearly or rotatably in order intermittently to connect its output to any one of the plurality of different input pressures. One disadvantage of this type of switch is that each time it is shifted from one input pressure to the next, its output is isolated from the pressure supply so that pressure to the output is momentarily interrupted.

Another type of pneumatic control device embodies the use of a conventional pressure regulator, which can be interposed between an output and a supply of compressed air to throttle or otherwise adjust the pressure of the air as it passes through the regulator. The disadvantage of such regulators is that, in order to be accurate, output pressure is always proportional to a spring tension, and is independent of the input pressure.

It is an object of this invention, therefore, to provide a novel instrument capable of dividing a compressed air input of predetermined value into a plurality of different output pressures, each of which will constitute a predetermined different percentage of the input pressure.

Another object of this invention is to provide a pneumatic potentiometer or instrument which is connected to a tubular plenum having thereacross a predetermined pressure drop, and which is adjustable to divide the pressure drop into any one of a plurality of different output pressures each of which is proportional to a different, predetermined percentage of the pressure drop across the plenum.

A more specific object of this invention is to provide a novel instrument in which a supply of compressed air is applied to one end of a tube the opposite end of which exhausts to the atmosphere, and which at spaced points therealong is connected by a plurality of separate, tubular ducts to a control valve which is operable selectively to connect one of the ducts to the output of the valve, thereby to produce an output pressure which is equal to a predetermined percentage of the pressure drop in the supply tube.

Other objects of the invention will be apparent hereinafter from the specification and from the recital of the appended claims, specifically when read in conjuction with the accompanying drawings.

SUMMARY OF THE INVENTION

An elongate, tubular conduit of relatively small internal diameter is formed to have intermediate its ends a plurality of axially spaced, radial ports. A supply of compressed air of predetermined pressure is supplied to one end of the conduit and is vented to the atmosphere at the opposite end of the conduit, so that the air pressure in the conduit drops at a generally uniform rate from a maximum $P_s$ at the inlet end of the conduit, to zero gauge pressure $P_o$ at its vented end. Means in the form of an adjustable selector element is employed selectively to connect one of the axially spaced openings in the conduit to an output port, whereby the pressure at the last-named port can be adjusted to any one of the pressures that exist at said radial ports in the conduit.

In one embodiment the tubular conduit is formed by a plurality of intersecting grooves formed in the outer periphery of a cylindrical member which is the housing of the pneumatic switch used to select the output pressure.

In another embodiment the tubular conduit comprises a plurality of separate, tubular coils that are interconnected by a manifold having therein a plurality of spaced ports corresponding to the axially spaced ports in the conduit.

Figures 1, 2:
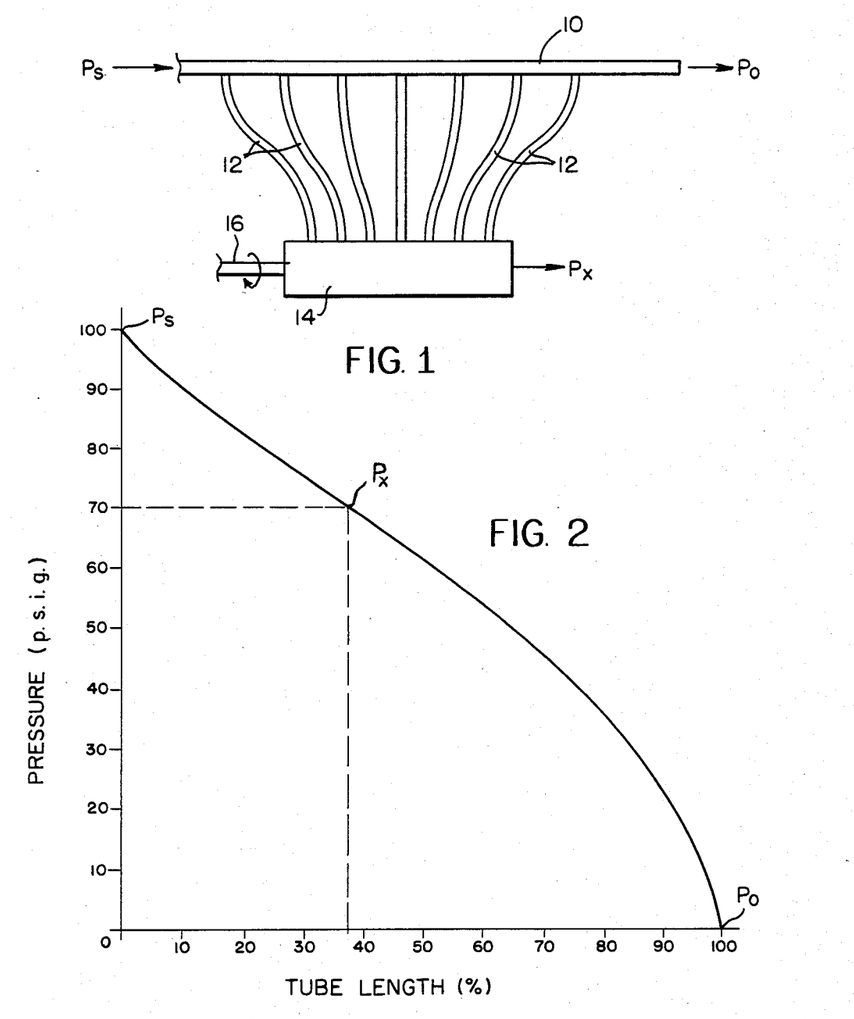
FIG. 1 illustrates diagramatically the principal upon which this invention is based.
FIG. 2 is a graph illustrating the relationship between the length of a tube, and the pressure drop which exists in the tube when the tube is utilized in accordance with the principals of this invention.

Referring now to the drawings by numerals of reference, and first to FIGS. 1 and 2, 10 denotes an elongate, thin capillary tube, which is connected at one end (for example its left end in FIG. 1) to a supply of compressed air (pressure $P_s$), and which opens at its opposite end to the atmosphere (pressure $P_o$). The air flowing through tube 10 experiences a constant, approximately linear pressure drop from the input pressure $P_s$ (gauge) to the output pressure $P_o$. The pressure in the tube 10 at spaced points therealong can be sampled by using tubes 12 to connect axially spaced openings in the tube 10 with a distributor device 14. Device 14 has an operating shaft 16 which can be rotated to produce at the output of the device a preselected pressure $P_x$, which will correspond to the pressure in the tube 10 as sensed by one of the several tubes 12.

Assuming that tubes 12 are negligble in length, or that compensation has been made for their respective lengths, it has been determined that the pressure as sensed by any one of the tubes 12 will be substantially directly proportional to the distance of the tube 12 (i.e. where it opens on tube 10) from to inlet end ($P_s$) of tube 10. For example, the solid line curve or graph in FIG. 2 illustrates the relationship between the pressure drop in a tube 10 as determined emperically using a ten foot long tube having a 1/32 inch internal diameter, and with a supply or input pressure $P_s$ of 100 psig. It will be noted that the ratio of the pressure at any point along the tube, relative to the percentage of its tube length, is nearly linear. In any case, having determined this curve for a given tube 10, it is then possible to determine exactly where along the length of the tube it must be tapped in order to sense a predetermined pressure drop relative to the input pressure of 100 psig. For example, as shown by broken lines in FIG. 2, to produce an output pressure $P_x$ at the output of the distributor device 14. when using a tube 10 having the length and size noted above, the port or opening in the tube will have to be located at approximately thirty-eight percent along its tube length as measured from the input end $P_s$. Thus, by using the curve illustrated in FIG. 2, it will be possible to determine the necessary axial location of the port in tube 10 for any desired pressure output $P_x$.

Referring now to FIGS. 3 to 5, 20 denotes generally a novel distributor device or pneumatic potentiometer of the type described, which comprises a tubular housing 22 having secured coaxially therein a cylindrical body 23, which is equal in length to the housing. Secured at one end in a first pair of axially extending blind bores 24 and 25, which are formed in one end of body 23 (the right end of FIG. 4) adjacent one diametral side thereof (the lower side in FIG. 5), are two tubes 26 and 27, respectively, which are used for connecting these bores to a supply of compressed air ($P_s$) and to the atmosphere ($P_o$), respectively. A further blind bore 28, which is formed in the same end of the body 23 in spaced, parallel relation to the bores 24 and 25 is connected at its outer end to a tube 29, which as noted hereinafter is disposed to deliver a predetermined output pressure $P_x$ that falls somewhere between the pressures $P_s$ and $P_o$.

Figure 3:
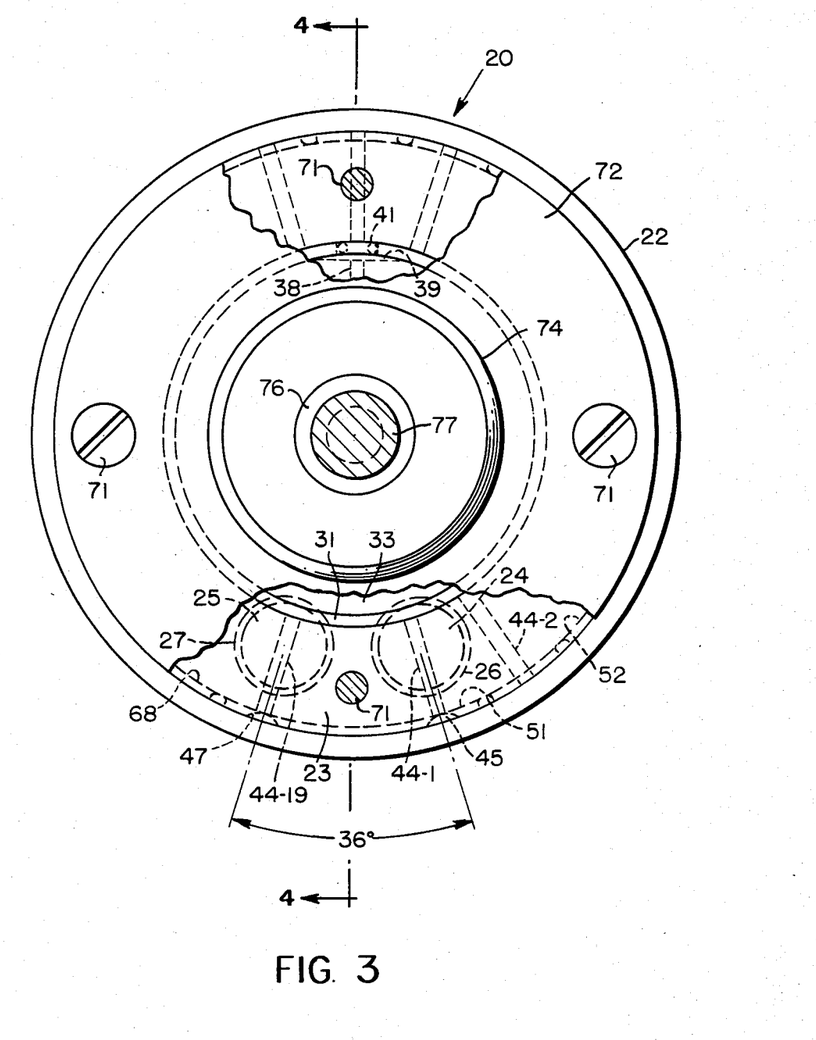
FIG. 3 is a fragmentary end elevational view of a pneumatic potentiometer made according to one embodiment of this invention, portions of the potentiometer housing being cut away for purposes of illustration.
Figure 4:
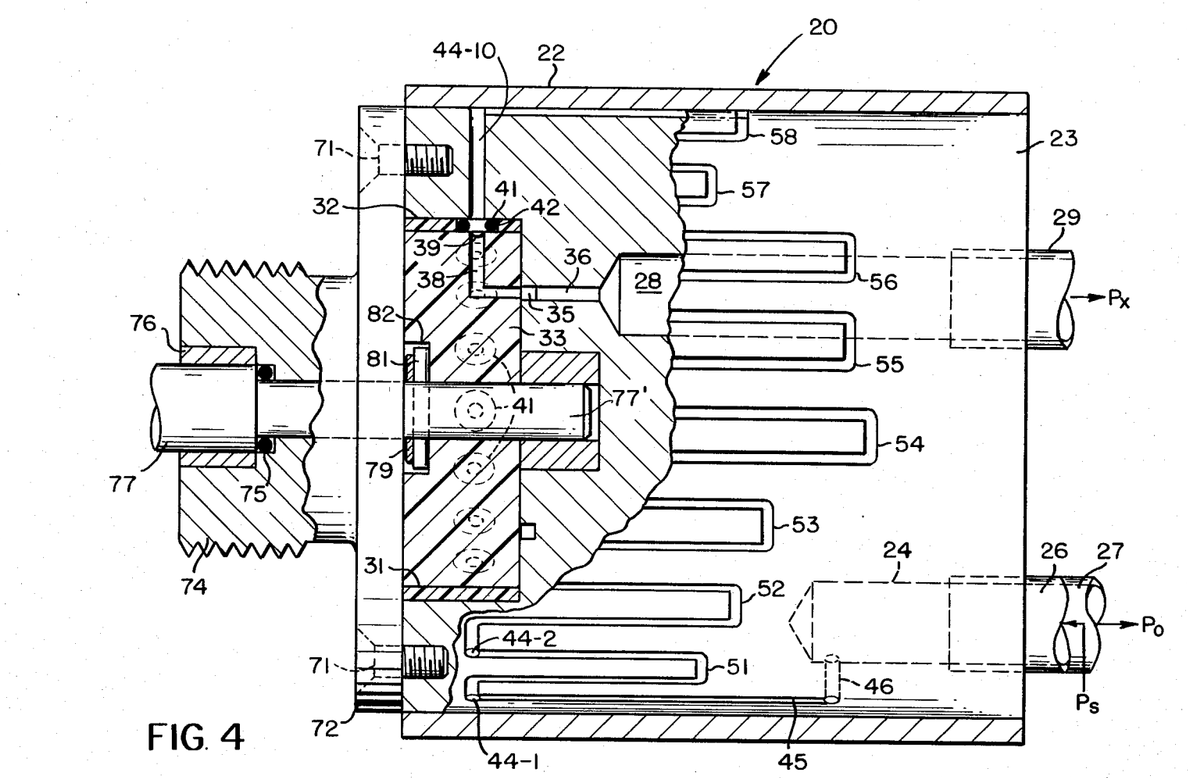
FIG. 4 is a fragmentary sectional view taken generally along the line 4—4 in FIG. 3 looking in the direction of the arrows, but with portions of the potentiometer being shown in full.
Figure 5:
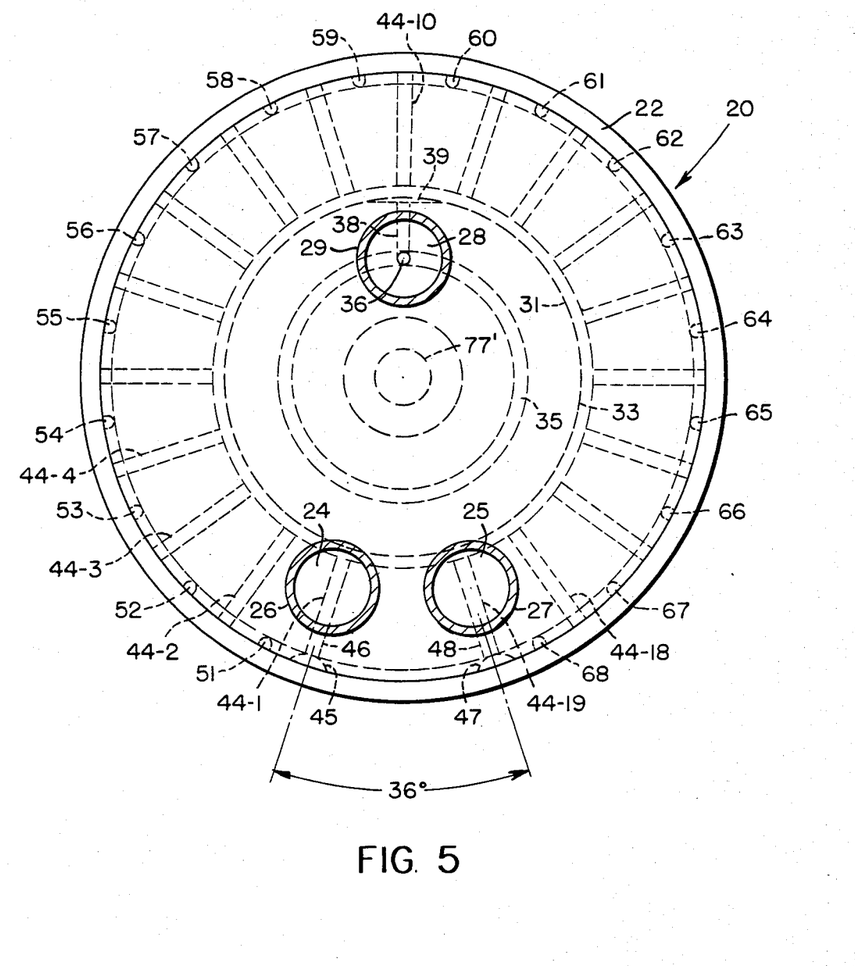
FIG. 5 is a fragmentary elevational view of the opposite end of this potentiometer.

Rotatably mounted in a ring bearing 31, which is secured in a circular recess 32 that is formed in the opposite end of the body 23 coaxially thereof, is an annular spool or pressure selector member 33. The inner end of member 33 overlies and seals an annular recess or circumferential groove 35, which is formed coaxially in the body 23 at the bottom of recess 32. Groove 35 is connected by an axially extending port 36 in the body 23 with the inner end of the output pressure supply duct 28. Groove 35 is also connected with one end with a right-angularly shaped port 38, which is formed in the selector member 33 to open at one end on the groove 35, and at its opposite ends on a shallow, chordal groove 39, which is formed in the outer peripheral surface of the selector member 33 to extend parallel to the opposed end surfaces of member 33, and equidistantly (for example nine degrees) from opposite sides of the centerline of the registering end of the port 38.

As noted in greater detail hereinafter, the end of port 38 which opens on the groove 39 is also registrable selectively with the opening in any one of nineteen, resilient O-rings 41 (FIGS. 3 and 4) which are secured in equiangularly spaced radial openings 42 that are formed in the bearing 31 at eighteen degree intervals about its axis. Each of the O-rings 41 registers with one of nineteen equiangularly spaced radial ports or openings 44-1 through 44-19, which are formed at eighteen degree intervals in the annular portion of the body 23 which surrounds its recess 32. As shown in FIGS. 3 and 5, the first and last of these ports, which are denoted by the numerals 44-1 and 44-19, respectively, are angularly spaced from each other thirty-six degrees about the axis of the body 23. Also as shown in FIG. 4, the port 44-1 communicates at its outer end with one end of a shallow, axially extending groove 45, which is formed in the outer peripheral surface of the body 23 to communicate at its opposite end through a radial port 46 in body 23 with the inner end of the compressed air supply duct 24. The port 44-19, on the other hand, communicates at its outer end with one end of another, shallow, axially extending groove 47 (FIGS. 3 and 5), which is formed in the outer peripheral surface of body 23 to communicate at its opposite end through a radial port 48 with the inner end of the vent duct 25.

Compressed air inlet port 44-1 is also connected at its outer end to one end of a shallow, generally U-shaped grove 51 (FIG. 4), which is formed in the outer peripheral surface of the body 23 to connect port 44-1 with the next adjacent port 44-2, which is angularly spaced eighteen degrees from port 44-1. In a similar manner, port 44-2 is connected by another, generally U-shaped groove 52 in the outer periphery of the body 23 with the next adjacent port 44-3, which is angularly spaced thirty-six degrees counterclockwise from the port 44-1 as shown in FIG. 3; and in turn this last-mentioned port is connected by still another U-shaped groove 53 in the outer periphery of the body 23 with the next adjacent such port. In a similar manner the remaining diametral side of body 23 is provided with spaced, generally U-shaped grooves 54, 55, 56, 57, 58 and 59 (FIGS. 4 and 5) which, as will be apparent from above, function to interconnect most of the remaining adjacent pairs of the ports 44 that open on this particular diametrial side of body 23. Although not illustrated in FIG. 4, it will be apparent that similar U-shaped grooves are formed in the other diametral side of the body section 23, as denoted for example by numerals 61 through 68 in FIG. 5, therby to connect together adjacent ports 44 which open on the other diametrial side of body 23. Also as shown in FIGS. 3 and 5, the last of these eighteen, generally U-shaped grooves, which is denoted at 68, connects the second-last port 44-18 with the vent or zero pressure port 44-19. As noted in greater detail hereinafter, the exact configuration and length of the respective grooves 51 through 68 can be varied as desired.

Secured by a plurality of screws 71 to the face of the body 23 remote from the tubes 26, 27 and 29 is a circular end plate 72, which has projecting from its outer surface a reduced-diameter, externally threaded hub 74. Secured in a counterbore in the outer end of the hub 74 is a resilient O-ring or sealing ring 75 (FIG. 4) which is held beneath the inner end of a ring bearing 76 that is secured in a larger counterbore in the hub. Mounted intermediate its ends in the bore of the bearing 76 is a rotatble operating shaft 77, which has on its inner ends a reduced diameter section 77' that extends coaxially through registering bores in the hub 74, the end plate 72 and the annular selector member 33. Intermediate its ends the reduced-diameter shaft section 77' is secured against axial movement by a resilient C-ring 79, which is secured in an annular recess formed in the shaft extension 77' intermediate its ends. Ring 79 is seated at one side against the inside face of the end cap or plate 72, and at its opposite side against a clutch pin 81, which is secured in a diametrial bore in the shaft extension 77' so as to seat at opposite ends thereof in a shallow notch or recess 82, which extends transversely across the bottom of the recess which accommodates the ring 79. The clutch pin 81 operatively couples the shaft 77 to the selector member 33, so that the rotation of shaft 77 is imparted directly to member 33.

In use, a supply of air under pressure $P_s$, which for example may be approximately 100 psig., is applied from a source thereof through the tube 26, the bore 24, the port 46 and the groove 45 in the outer periphery of the body 23 to the inlet or maximum pressure port 44-1. At this moment, assuming that the selector member 33 is in the position illustrated in FIGS. 3 and 4, the outer peripheral surface of the selector 33 will register with and operatively seal the radially inner ends of all of the ports 44-1 thorugh 44-19, except port 44-10 which at this time is connected through the selector port 38 and bore 28 with pipe 29. Moreover, at this time, the outer end of port 44-1, as shown in FIG. 4, is connected by the groove 51 to the next adjacent port 44-2, which in turn is connected by groove 52 to the outer end of the next port 44-3. It will be readily apparent that the air under pressure from port 44-1 is thus free to travel successively through the U-shaped grooves or loops 51-68, thereby passing entirely around the outside of the body 23 and ultimately being discharged through the vent groove 47, the radial port 48 and the vent bore and tube 27 to atmosphere. In essence, therefore, the pressure is highest at the input port 44-1, and is substantially zero, or approximately so, at the last port or vent opening 44-19.

In the example under consideration, since the selector port 38 registers with port 44-10, the pressure ($P_x$) applied to the output tube 29 will be equal to the pressure applied to the input port 44-1 less the pressure drop which is created by virtue of the passage of the compressed air from the input port 44-1 successively through the U-shaped grooves 51-68 to the selected port 44-10. Therefore, the pressure which exists at the point where the port 44-10 intersects the end of the groove 59 will be proportional to the percentage that the overall length of the grooves 51 through 59 represents relative to the overall length of each of the grooves 51 through 68. For this reason, the overall length of each groove 51 through 68 is selected to provide a predetermined pressure drop as between the pressures which appear between successive ports 44-1 to 44-19 in the body 23. In the present case, since there are nineteen such ports, the overall pressure drop from 100 psig. to zero gauge pressure can be divided into eighteen different increments.

As shown more clearly in FIG. 3, whenever the outer end of the selector port 38 is in registry with one of the ports 44-1 to 44-19, opposite ends of the intersecting slot 39 will be located adjacent to, but out of registry with, the next adjacent such ports. Thus, at that particular moment, only the pressure existing at the registering port 44-10 is applied to the output pressure tube 29. However, as soon as the selector member 33 begins to rotate in either one direction or the other, one end or the other of the groove or slot 39 will pass into registry with the next adjacent such port, so that during movement of the selector port 38 into registry with the next such port, the slot 39 will be simultaneously connected to both of the adjacent ports. The advantage of this construction is that it assures that there will always be a steady output pressure at the tube 29, although at any given instant this pressure may be increasing or decreasing slightly as the selector port 38 is rotated in one direction or the other.

Referring now to FIGS. 6 to 9, 81 denotes a rectangularly shaped plenum or manifold, which can be made from aluminum or the like. In its upper surface the manifold has therein a plurality (ten in the illustrated embodiment) of staggered, vertical ports, one of which is identified as the IN port, the next eight of which are denoted by the numerals 1 through 8, respectively, and the last of which is denoted by the letter V. These ports are laterally offset from each other adjacent opposite sides of the manifold 81, and as noted in greater detail hereinafter, communicate at their lower or inner ends with one of a plurality of spaced ports or ducts, which extend transversely of the manifold.

Figures 6, 7, 8, 9:
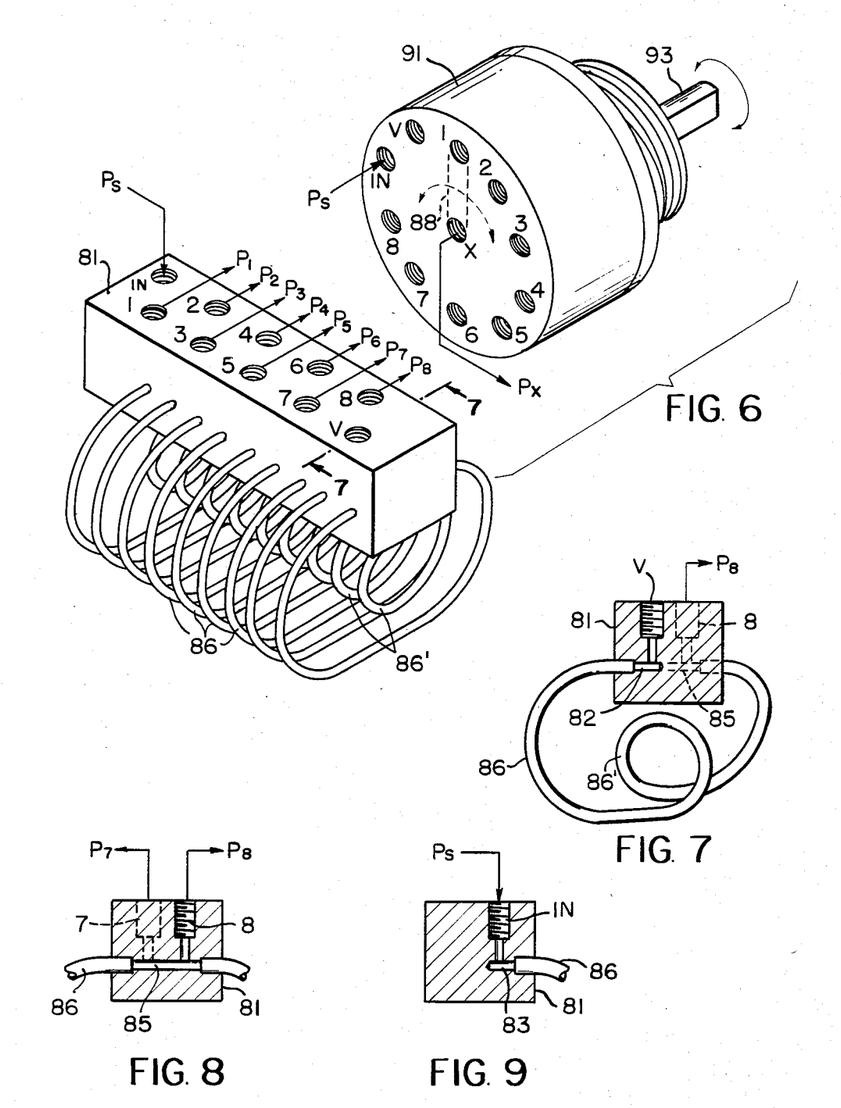
FIG. 6 is an exploded perspective view of a pneumatic potentiometer made in accordance with a second embodiment of this invention, but with portions of the tubular connections between the plenum and switch being shown diagramatically.
FIG. 7 is a fragmentary sectional view taken along the line 7—7 through the plenum as shown in FIG. 6 looking in the direction of the arrows.
FIGS. 8 and 9 are sectional views similar to FIG. 7, but taken at different points along this plenum.

For example, as shown in FIG. 7, the port V communicates at its lower end with a blind bore or duct 82, which extends from one side of the manifold (the left side as shown in Fig. 7) only part way into the manifold, but at least far enough to communicate at its inner end with the lower end of the port V. At the opposite end of the manifold (FIG. 9) the inner or lower end of the IN port communicates with the inner end of a further blind bore or port 83, which extends transversely and part way inwardly of the manifold 81 from the side opposite that containing the duct 82. Between the ducts 82 and 83 the manifold 81 has therethrough eight equispaced, transversely extending ducts or ports 85 (only one of which is shown in FIG. 8), which extend completely through the manifold parallel to ducts 82 and 83, and which open intermediate their ends on the inner end of a single one of the manifold ports 1 through 8, respectively.

As shown for example in FIG. 8, the inner end of the port 8 opens on a transverse duct 85, which extends completely between opposite sides of the manifold 81; and it will be appreciated that each of the remaining ports 1 through 7 likewise open at their inner ends on a single, transversely extending duct 85.

The outer ends of the transversely extending ducts 82, 83 and 85 in the manifold 81 are interconnected by a plurality (nine in the embodiment illustrated) of tubular elements denoted by the numerals 86. Each of the elements 86 is similar in configuration and has formed intermediate its ends, a loop 86' (FIGS. 6 and 7) simply to contribute to the overall length of the element. Opposite ends of each element 86 are connected to adjacent ones of the transverse ducts which open at opposite sides, respectively, of the manifold 81. Duct 82, for example is connected to one end of the first element 86, the opposite end of which is connected at the opposite side of the manifold to the outer end of the next adjacent transverse duct 85, which communicates with the manifold port 8. The next adjacent element 86 is connected as shown in FIG. 8 at one end to the opposite end of last named duct 85, and coils back to the opposite side of the manifold which it is connected to the next duct 85 that is in communication with the manifold port 7.

In a similar manner the remaining tubular elements 86 are used to innerconnect successive ducts 85 until the terminal end of the ninth or last element 86 in the series thereof is secured in the outer end of the duct 83 that communicates with the IN port.

Mounted adjacent the manifold 81 is a conventional pressure valve or switch 91, which has therein a central bore X, and ten axially extending ducts that are arranged in a circular path around the outside of its central bore. To simplify the disclosure, these ten ducts are denoted in FIG. 6 by the same numerals and letter (1 through 8 and the letters V and IN), which are used to denote the ten ports in the manifold 81. The two IN ports in the manifold 81 and switch 91, respectively, are each connected to the same supply of compressed air by tubes or pipes denoted schematically at PS. Each of the ports denoted by the letters V in the manifold 81 and switch 91 are vented to the atmosphere, although in practice it may be desired to innerconnect these two ports.

The ports denoted 1 through 8 in the upper surface of manifold 81 are connected by respectively different pipes or tubes $P_1$, $P_2$, $P_3$, $P_4$, $P_5$, $P_6$, $P_7$, and $P_8$ to the correspondingly numbered ducts 1 through 8 in the switch 91. Switch 91 also has therein a radially extending selector duct or port 88, which is similar to the port 38 referred to in the first embodiment. This port is adapted to be rotated selectively in opposite directions by the switch operating shaft 93 in order selectively to connect the axial bore X in switch 91 with one of the surrounding switch ducts 1 through 8, or with the associated IN or V duct. (In the drawings the selector port 88 is illustrated schematically, but since switch 91 is of conventional design it will be readily apparent to one skilled in the art how it operates).

In use, compressed air at a predetermined pressure, for example 100 psig. is suppled to the IN port in the manifold 81, and because of the connecting tubular elements 86, passes successively through each of the elements 86, finally to be vented or exhausted to the atmosphere at the outlet port V in the manifold 81. The diameters of the varous transverse ducts 82, 83 and 85 in the manifold 81 are equal in diameter to the internal diameter of each of the tubular elements 86, so that the tubular elements 86 and manifold as shown in FIG. 6, assuming that any additional tubular connections also have essentially the same internal diameter, are the equivalent of an elongate, thin, capillary tube of the type previously described. Assuming, for example, that the assembly as shown in FIGS. 6–9 replicates the tube which was used to prepare the curve in FIG. 2, then it is possible to determine what tube lengths will be required for the elements 86 in order to produce predetermined output pressures at the ports 1 through 8 of the manifold 81. It is then possible, simply by rotating the shaft 93, to position the selector port 88 in communication with any one of the ducts 1 through 8 in the switch 91, so that that particular output pressure $P_x$ in that duct will appear at the axial bore X in member 91.

One typical use of the above described instrument is to control the tension in a layer or web of material being transferred, for example, from a feed roll to a take up roll. In such cases decreasing output pressure $P_x$ of one of the above instruments may be applied to a pneumatic brake of conventional design, which may be attached in any known manner to the shaft of the feed roll. The brake can then be used to apply to the shaft a braking torque which will decrease in proportion to the quantity of the material withdrawn from the feed roll, for example by adjusting the shaft 77 or 93 in response to changes in the radius of the roll of web on the feed roll shaft. As the radius reduces the braking torque applied to the shaft will be automatically decreased to maintain the tension in the web constant.

Obviously the instrument could be used also for operating pneumatic clutches used on take-up rolls of the type used for transferring webs of the type discussed above. Other uses for such instruments will also readily occur to one skilled in the art.

Among the advantages of the invention is that each instrument produces an output pressure $P_x$ that is between zero and 100% of the input pressure $P_s$. The rate of change in the pressure in the tubular plenum is substantially linear from the inlet to the outlet thereof, thus making it very easy to determine the pressure of the air or gas in the plenum at any particular point along its length. The percentage of change in the output pressure of the instrument, is determined by setting of the shaft 77 or 93 in response to a follower or sensing element of a device that is to be controlled. The force necessary to turn shaft 77 or 93 is minimal and is in no way proportional to the input ($P_s$) or output ($P_x$) pressures. Moreover, no other than the input pressure is necessary to operate the instrument.

While the two instruments disclosed above use rotary shafts for adjusting the pressure $P_x$, it will be apparent that reciprocable selectors could be used instead. The ports $P_s$, $P_x$ and 1–8 in the housing 91, for example, could be axially spaced from one another in a line, and the selector 93 could be mounted for linear reciprocation in housing 91.

Moreover, while only certain embodiments have been illustrated and described herein, it will be apparent that it is capable of still further modification, and that this application is intended to cover any such modifications as may fall within the scope of one skilled in the art, or the appended claims.

What I claim is:

1. An instrument for selectively supplying any one of a plurality of different, predetermined fluid pressures to a fluid operated device, comprising means defining an elongate, tubular plenum having an inlet at one end thereof, an outlet at its opposite end, and a plurality of spaced exhaust openings formed therein at axially spaced points intermediate its ends, means for connecting said inlet to a supply of fluid under a first predetermined pressure, means for connecting said outlet to a system maintained at a pressure lower than said first predetermined pressure, so that said fluid flows through said plenum from said inlet to said outlet, said plenum having a substantially uniform diameter throughout its length, whereby the pressure of said fluid drops in a substantially linear manner during its passage through said plenum, and thus presents a different, predetermined fluid pressure at each of said exhaust openings in said plenum, and valve means having a single output port disposed to be secured in communication with said fluid operated device, said valve means including a movable selector element for selectively placing any one of said spaced exhaust openings in communication with said output port, thereby to apply a predetermined one of said different fluid pressures to said device.

2. An instrument as defined in claim 1, wherein said valve means includes means operative during movement of said selector element always to maintain said output port in communication with at least part of one of said exhaust ports.

3. An instrument as defined in claim 1, wherein
   said means defining said tubular plenum comprises a housing containing said plenum and having thereon an operative surface containing a plurality of spaced openings two of which communicate with said plenum inlet and outlet, respectively, and the remainder of which communicate with said exhaust ports in said plenum, and said selector element and said housing are connected for movement one relative to the other with an operating surface on said selector element being disposed in confronting relation to said operating surface on said housing, and said selector element having therethrough an exhaust duct one end of which opens on the operating surface of said selector element selectively to register with one of said exhaust openings on said operating surface of said housing, and the opposite end of which is in constant communication with said output port.

4. An instrument as defined in claim 3, wherein said housing comprises a cylindrical member enclosed coaxially within a sleeve, and said tubular plenum is formed by an elongate groove formed in one of the confronting peripheral surfaces on said member and said sleeve, respectively.

5. An instrument as defined in claim 4, wherein said elongate groove is formed in the outer peripheral surface of said cylindrical member, said selector element comprises a cylindrical valve stem rotatably mounted in an axial bore in said cylindrical member coaxially thereof, said operating surfaces comprise the confronting inner and outer peripheral surfaces on said cylindrical member and valve stem, respectively, said inlet and outlet and said exhaust openings in said plenum are connected to said inner peripheral surface of said member by a plurality of radial ports formed in said member at angularly spaced points about its axis, and said exhaust duct is formed in said valve stem to open at one end on the outer peripheral surface of said stem selectively to register with one of said radial ports in said member, and to open at its opposite end on an annular recess formed in said cylindrical member to communicate with said output port.

6. An instrument as defined in claim 1, wherein said means defining said tubular plenum comprises a plurality of tubes of like internal diameter, and means connecting said tubes in series with each other, and with a first tube in the series thereof being connected to said supply of fluid under pressure and the last tube in said series to said system, whereby said fluid under pressure travels successively through said tubes from the first to the last thereof.

7. An instrument as defined in claim 6, wherein said tube connecting means includes a housing having therein a first series of ducts interconnecting said tubes in a serial manner, and a second series of ducts each of which opens at one end on one of said first series of ducts and at its opposite end on said valve means externally of said housing, and said valve means includes a movable valve stem defining said selector element and movable selectively to connect one of said second series of ducts to said output port.

8. An instrument as defined in claim 7, wherein said tubes are coiled intermediate their ends.

9. A pneumatic potentiometer for selectively supplying compressed air or gas at any one of a plurality of different, predetermined pressures to a pneumatically operated device, comprising a valve mechanism having an output port connected to said device, means defining an elongate, tubular plenum of substantially uniform internal diameter, said plenum being open at one end to atmosphere and disposed to be connected at its opposite end to a supply of air under pressure, whereby air is disposed to flow continuously through said plenum under a pressure which drops substantially linearly during flow of the air from said one end to said opposite end of the plenum, and means defining a plurality of exhaust ducts, each of said exhaust ducts opening at one end on said plenum at axially spaced points therealong, and at their opposite ends on said valve mechanism, said valve mechanism including a movable valve stem having a single output duct, said output duct having one end opening at all times on said output port, and having an opposite end movable with said stem selectively into registry with one of said exhaust ducts, thereby selectively to apply one of a plurality of different air pressures to said output port.

10. A pneumatic potentiometer, as defined in claim 9, wherein said means defining said plenum comprises a cylindrical housing secured coaxially in a sleeve and having therein a series of interconnected passages extending without interruption around its outer peripheral surface, said valve stem has a cylindrical head portion rotatably mounted in a bore in said cylindrical housing, said means defining said exhaust ducts comprises a plurality of radially extending openings formed in said cylindrical housing at angularly spaced points about the housing axis to open at one end on said passages at spaced points therealong, and at their opposite ends on the periphery of said head portion of said valve stem, and said opposite end of said output duct in said valve stem opens on the periphery of said head portion of said stem selectively to register with said radial openings.

11. A penumatic potentiometer as defined in claim 9, wherein said means defining said plenum comprises a plurality of tubes connected serially together by a housing, said housing has therein a first plurality of housing ducts each of which extends between the end of one of said tubes in the series thereof and the inlet end of the next tube in said series, and said series of interconnected tubes is connected at one end to said supply of air under pressure and exhausts to atmosphere at its opposite end.

12. A pneumatic potentiometer as defined in claim 11, wherein said housing has therein a second set of housing ducts extending transversely of said first set of housing ducts and defining said exhaust ducts.

* * * * *